(12) United States Patent
Saveliev et al.

(10) Patent No.: US 6,572,016 B2
(45) Date of Patent: Jun. 3, 2003

(54) FOOD CONTAINERS WITH TRANSPONDERS

(75) Inventors: Michael Saveliev, Huntington Beach, CA (US); James R. Schuster, Las Flores, CA (US)

(73) Assignee: Shurflo Pump Manufacturing Company, Inc., Cypress, CA (US)

( * ) Notice: Subject to any disclaimer, the term of this patent is extended or adjusted under 35 U.S.C. 154(b) by 0 days.

(21) Appl. No.: 10/151,378

(22) Filed: May 20, 2002

(65) Prior Publication Data

US 2002/0134831 A1 Sep. 26, 2002

Related U.S. Application Data

(62) Division of application No. 09/657,496, filed on Sep. 8, 2000.
(60) Provisional application No. 60/153,172, filed on Sep. 9, 1999.

(51) Int. Cl.[7] ............................................. G06K 15/00
(52) U.S. Cl. ....................................................... 235/383
(58) Field of Search ....................... 220/592.17; 235/383

(56) References Cited

U.S. PATENT DOCUMENTS

| | | |
|---|---|---|
| 3,695,314 A | 10/1972 | Watts et al. |
| 3,904,079 A | 9/1975 | Kross |
| 4,063,229 A | 12/1977 | Welsh et al. |
| 4,278,186 A | 7/1981 | Williamson |
| 4,993,593 A | 2/1991 | Fabiano et al. |
| 5,024,014 A | 6/1991 | Swierczek |
| 5,133,480 A | 7/1992 | Matsumoto et al. |
| 5,268,849 A | 12/1993 | Howlett et al. |
| 5,291,004 A | 3/1994 | Frank et al. |
| 5,301,802 A | 4/1994 | Nemeroff |
| 5,420,797 A | 5/1995 | Burns |
| 5,497,140 A | 3/1996 | Tuttle |
| 5,505,349 A | 4/1996 | Peckels |
| 5,566,732 A | 10/1996 | Nelson |
| 5,566,856 A * | 10/1996 | Fallen et al. ................ 221/150 |
| 5,603,430 A | 2/1997 | Loehrke et al. |
| 5,604,681 A | 2/1997 | Koeninger |
| 5,605,182 A * | 2/1997 | Oberrecht et al. ............ 141/94 |
| 5,842,603 A | 12/1998 | Schroeder et al. |
| 5,874,896 A | 2/1999 | Lowe et al. |
| 6,193,154 B1 | 2/2001 | Phillips et al. |

* cited by examiner

Primary Examiner—Karl D. Frech
Assistant Examiner—Daniel A. Hess
(74) Attorney, Agent, or Firm—Michael Best & Friedrich LLP

(57) ABSTRACT

Food and beverage containers with attached or connected transponders. In one embodiment, relatively inexpensive passive transponders are used and are embedded or otherwise attached to the food and beverage containers. A transponder exciter is placed in or near the food or beverage dispenser for energizing the transponder on the food or beverage container, and for discerning information therefrom. Alternatively, active transponders can be used and an non-exciter reader can be used. The information from the containers can be used to track the containers and control the amount of consumable material with which the containers are filled, the number of times the containers are filled, and the type of material with which the containers are filled.

24 Claims, 12 Drawing Sheets

FOOD CONTAINERS WITH TRANSPONDERS

RELATED APPLICATIONS

This application is a divisional of U.S. patent application Ser. No. 09/657,496, filed Sep. 8, 2000, which claims the benefit of provisional application No. 60/153,172 filed on Sep. 9, 1999.

BACKGROUND OF THE INVENTION

1. Field of the Invention

The present invention relates to food and beverage dispensing devices. More particularly, the invention relates to automated food and beverage dispensers and containers for use with same.

2. Description of Related Art

Automated beverage dispensers have been developed for conserving beverage and increasing the productivity of the operator. One such automated beverage dispensing apparatus incorporates a bar code reader for discerning information pertaining to a beverage to be dispensed into a container. An automated beverage dispenser of this general nature is shown, by way of example, in U.S. Pat. No. 4,566,732.

However, optical systems have several deficiencies. Optical bar code readers can suffer from misalignment of the bar code on the container with the bar code reader of the dispenser. This is true even when multiple bar codes encircling the container are used. In addition, multiple barcodes are aesthetically unappealing.

Another problem with barcode systems is that the optical recognition is often compromised by optical occlusions of the bar code, such as, for example, a finger of a user, a food particle, or a napkin. Thus, there continues to be a need for delivering and/or dispensing food and beverages with increased accuracy, effectiveness, and efficiency.

SUMMARY OF THE INVENTION

The invention provides food and beverage containers with attached or connected transponders. In one embodiment, relatively inexpensive, passive transponders are embedded in or otherwise attached to the food and beverage containers. A transponder exciter is placed in or near a food or beverage dispenser for energizing the transponder on the food or beverage container and for discerning information therefrom. The food and beverage containers and transponders of the invention do not suffer from misalignment problems, since any placement of the food or beverage container, regardless of container orientation within the field of the transponder reader or, near the transponder reader exciter, results in a transfer of information. Similarly, a hand of a user, a napkin, food, or other materials placed over the transponder will not hinder the transfer of information between the transponder and the transponder reader. The transponder can be completely concealed from the sight of a user, thus increasing the aesthetic appearance of the food or beverage container.

In one aspect of the invention, the containers are constructed to hold a consumable material, such as at least one of a food and a beverage. The container further includes a transponder attached or connected to the body. The transponder is constructed to receive a radio frequency (RF) excitation signal and, in response, to emit an RF response signal. Alternatively, the transponder can have its own power source and transmit the RF response signal on a continuous or periodic basis. The body of the container can include, for example, a paper-based food receptacle, a paper-based beverage receptacle, a plastic-based receptacle or cup, such as a polystyrene or Styrofoam cup, or other containers comprising glass, ceramic or metal. The body has an outside surface and an inside surface, wherein the inside surface is adapted to contact the consumable material, e.g., food or beverage, and the transponder is attached or connected, for example, to the outside surface of the body. Alternatively, the transponder can be embedded within the material.

The RF transponder signal can relate to a type of consumable material, for example, food or beverage, to be included or dispensed into the body. The RF response signal can also contain information relating to a plurality of types of consumable material, for example, food or beverage, to be placed or sequentially placed into the body. The RF response signal can further relate to a quantity or amount of consumable material, for example, food or beverage, to be placed or automatically placed into the body. The RF response signal can relate to the type and/or amount of consumable material to be dispensed or delivered and/or the sequence in which a plurality of such materials are to be dispensed or delivered. For example, the RF signal can relate to the type and amount and delivery sequence of a plurality of different types of condiments to be placed on an item of food, such as a sandwich.

In accordance with another aspect of the invention, a dispensing apparatus for filling a container includes a transponder exciter, a signal receiver, and a dispenser. The transponder exciter is constructed to generate and transmit an RF excitation signal that is adapted to energize the transponder. The signal receiver is constructed to receive an RF transponder signal from the transponder, which is connected or attached or coupled to a container. The dispenser is operatively coupled to the signal receiver, and is constructed to dispense a predetermined amount or quantity and quality of a consumable material, for example, at least one of a food and a beverage, in response to the reception of the RF transponder signal by the signal receiver. The signal receiver is constructed to receive RF transponder signals similar in nature and content to the RF transponder signals discussed above. The dispensing apparatus can further include an alignment device constructed to accommodate and align a container relative to the dispensing apparatus. The dispenser apparatus can maintain a record of each container in which consumable materials is dispensed. The system can be programmed to limit the number of dispensations that occur.

Other aspects and advantages of the present invention will become apparent in the following detailed description, examples, and claims.

DETAILED DESCRIPTION OF THE PRESENTLY PREFERRED EMBODIMENT

Figure 1:
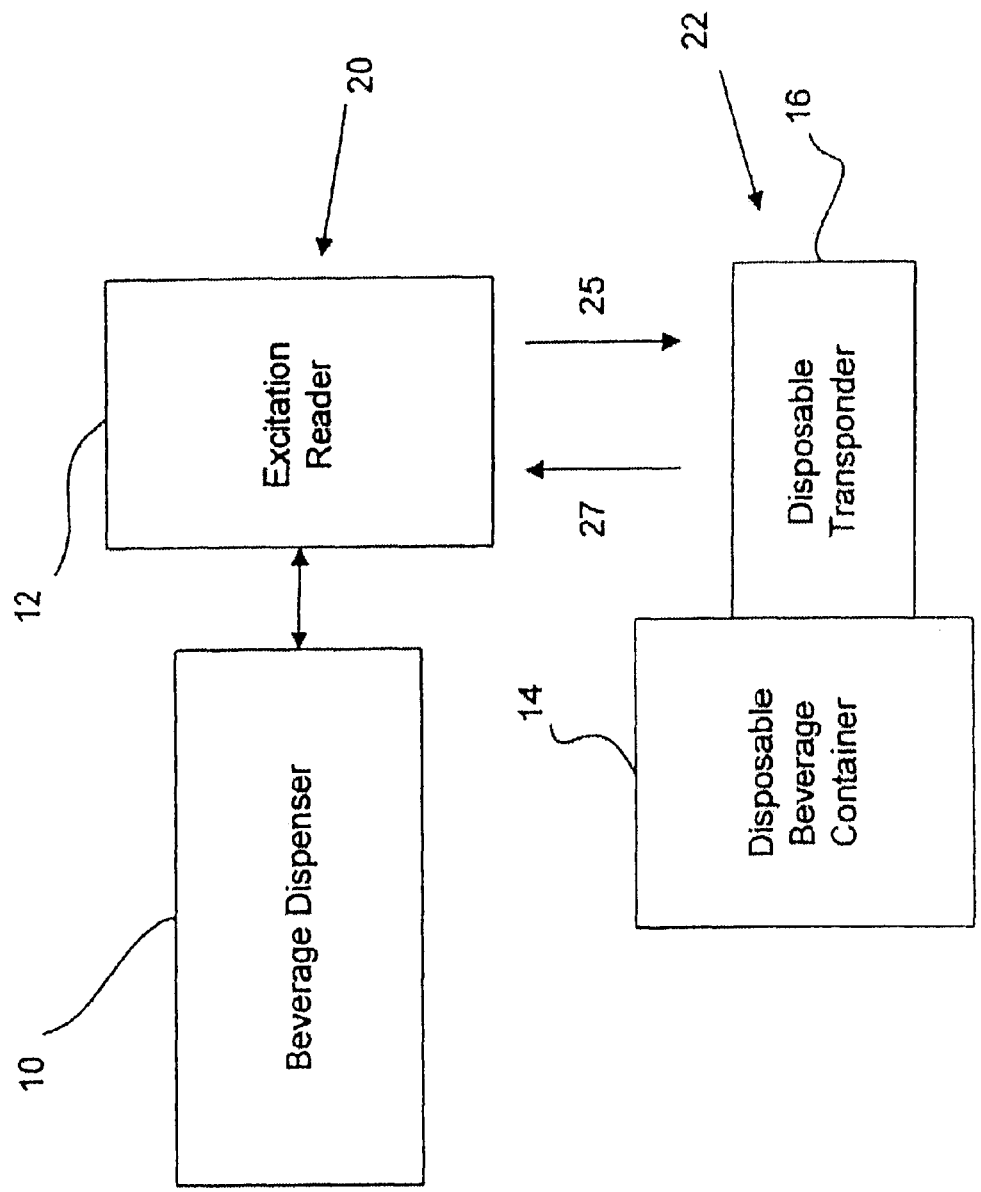
FIG. 1 illustrates a beverage dispenser and beverage container combination including an excitation reader and a transponder.

Referring more particularly to the drawings, FIG. 1 is a block diagram illustrating a beverage dispenser 10 electrically coupled to reader 12 which in the embodiment shown is an excitation reader, and a beverage container 14 coupled to a transponder 16. The beverage dispenser 10 and the excitation reader 12 comprise a beverage dispensing system 20, and the beverage container 14 and the transponder 16 comprise a beverage receiving system 22.

The transponder 16 preferably comprises a radio frequency (RF) transponder. RF transponder systems are typically used for providing communication links between remote locations without direct physical contact therebetween. As used herein, RF means that portion of the electromagnetic spectrum that is between the audio-frequency portion and the infrared portion.

The excitation reader 12 generates an RF excitation signal 25 and transmits it to the transponder 16. The transponder 16 receives the RF excitation signal 25 and is energized thereby, resulting in the transponder 16 generating a data signal 27 for transmission back to the excitation reader 12. The data signal 27 can indicate to the excitation reader 12 the size and/or type of beverage container 14, as well as transactional and payment information such as whether a fill-up of beverage into the beverage container 14 is authorized. Alternatively, the transponder 16 can be an active transponder with a power source such as a battery. An active transponder does not require excitation or energization from an exciter and continuously or periodically emits the data signal 27. When an active transponder is used, an excitation reader is not required. A non-excitation reader will suffice.

The transponder 16 is preferably mounted on an underside of the beverage container 14, which can comprise a paper-based material, polystyrene or Styrofoam material, plastic, or other materials. The transponder 16 can, alternatively, be embedded within the material of the beverage container 14. The container 14 can be a disposable container, meaning that it can be a container made of inexpensive materials such that the container can be thrown away with little or no concern of the expense involved in doing so. However, the container 14 can also be a relatively expensive container such as a mug, glass or the like that is reused numerous times, such as might occur in a restaurant or the like.

In accordance with one aspect of the present invention, the transponder 16 is affixed to the beverage container 14 at manufacture thereof, and is packaged for subsequent use. A vendor, selecting any of a variety of containers, can place the selected container beneath the beverage dispensing system 20, for an automatic fill-up of the proper type and quantity of beverage in accordance with the data signal 27 transmitted by the transponder 16 to the excitation reader 12.

The data signal 27 can further include a unique serial number, which is read and remembered by the excitation reader 12, preventing subsequent, unauthorized fill-ups. In large sports venues or other arenas where numerous beverage dispensing systems 20 can be used, the beverage dispensing system 20 can be connected via telephone lines or other communications networks to a computer (not shown) which monitors the operations of all of the beverage dispensing systems 20. The computer can provide cumulative sales information for the entire facility. As an example, a list of container serial numbers can be stored in the computer so that a serving container from one beverage stand can not subsequently be refilled at another beverage stand.

Similarly, for single beverage dispensing systems 20, a computer can be coupled to the excitation reader 12 for maintaining a list in memory of the serial numbers of beverage containers 14 in which beverage has already been dispensed. An individual serial number, indicating inter alia, size and make, can be maintained for each beverage container 14 being used. In response to receiving the serial number read from the transponder 16, the computer determines whether that particular serial number is already in the list. If the serial number is already in the list maintained by the computer, the dispensing of beverage into that beverage container 14 can be inhibited. Accordingly, an attempt to refill a beverage container 14 in which beverage was previously sold is prevented. The list can be cleared each day prior to commencing operation. If the serial number of the beverage container 14 is not in the computer's memory, then the serial number is added commensurate in time with the filling of the beverage container.

Excitation reader 12 preferably reads information from the data signal 27 indicative, for example, of a size of the beverage container 14. The size information can be used, for example, to determine how long of a time interval beverage is to be dispensed into the beverage container 14. For example, a look-up table and memory within the computer can provide the fill-time intervals for each of a number of various container sizes. The above discussion in connection with FIG. 1 is intended to apply to a large extent to the dispensing of any consumable material, which can include foods as well.

Figure 2B:
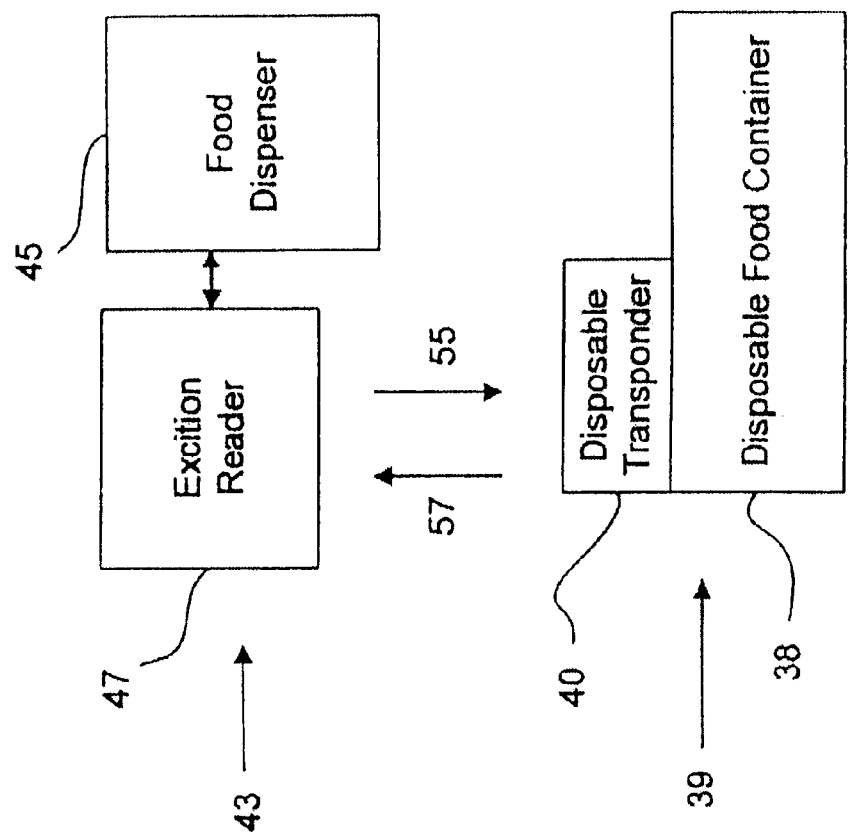
FIG. 2b illustrates an excitation reader and a food container combination including a food dispenser and a food container.
Figure 2A:
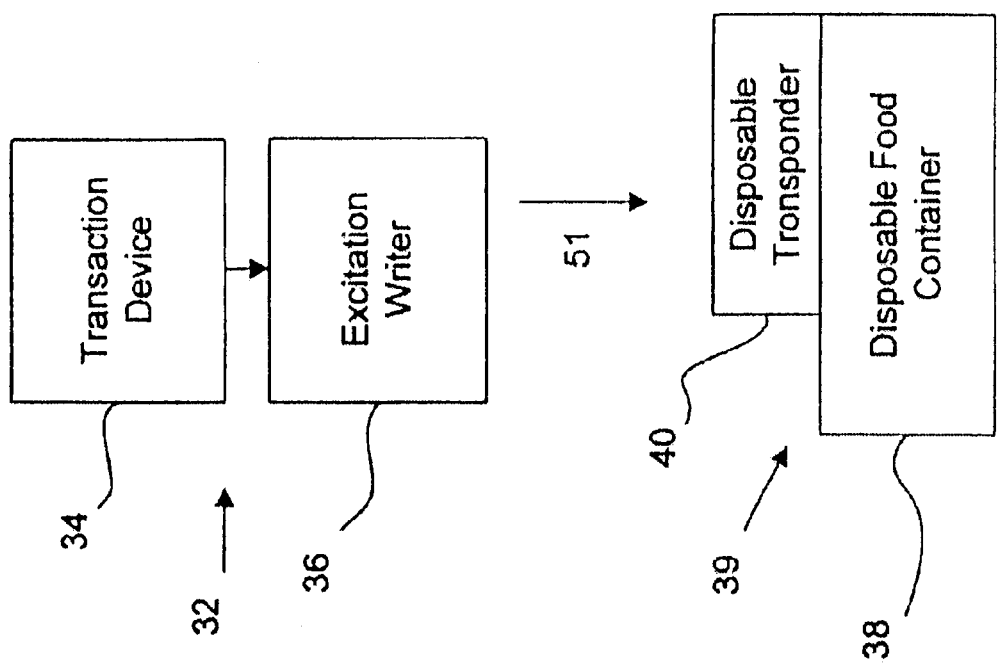
FIG. 2a illustrates a transaction device and food container combination including an excitation reader and transponder.

In dispensing foods, it is often necessary to dispense a number of various types of foods into a container in a predetermined sequence. For example, it can be desirable to automatically place various condiments on a sandwich in a predetermined fashion, according to a customer's request. FIG. 2a illustrates a food programming system 32 comprising a transaction device 34 and an excitation reader 36, and a food receiving system 39 comprising a food container 38 and a transponder 40. FIG. 2b illustrates a food dispensing system 43 comprising a food dispenser 45 and an excitation reader 47, and the food receiving system 39.

In accordance with the embodiment of FIGS. 2a and 2b, the transaction device 34 receives an order from a customer for a particular combination of consumable materials, which can include food and/or beverages. In the illustrated embodiment, the consumable material includes food. The transaction device 34 can be programmed with the customer's order, either by a cash register, teller, or automatically, for example. A food container 38 is positioned beneath the excitation writer 36 for programming of the transponder 40. The excitation writer 36 generates an RF write signal 51 containing information relating to the customer's order, to be programmed into the transponder 40. The RF write signal 51 is received by the transponder 40, causing the information from the RF write signal 51 to be stored within the transponder 40.

The food container 38 is subsequently moved to the food dispensing system 43 (FIG. 2b), wherein operation of the food dispenser 45, excitation reader 47, food container 38, and transponder 40 correspond generally to operation of the beverage dispenser 10, excitation reader 12, beverage container 14, and transponder 16 of FIG. 1. A read signal 55 from the excitation reader 47 energizes the transponder 40, causing the transponder 40 to send a data signal 57, containing the customer's order, to the excitation reader 47.

The excitation reader 47 subsequently directs the food dispenser 45 to automatically, or semi-automatically, prepare the customer's order within the food container 38. In an alternative embodiment, the food dispenser 45 comprises nothing more than visual and/or audible instructions to a food and/or beverage preparer, instructing the food preparer on the particulars for preparation of the customer's order within the food container 38.

Figure 3:
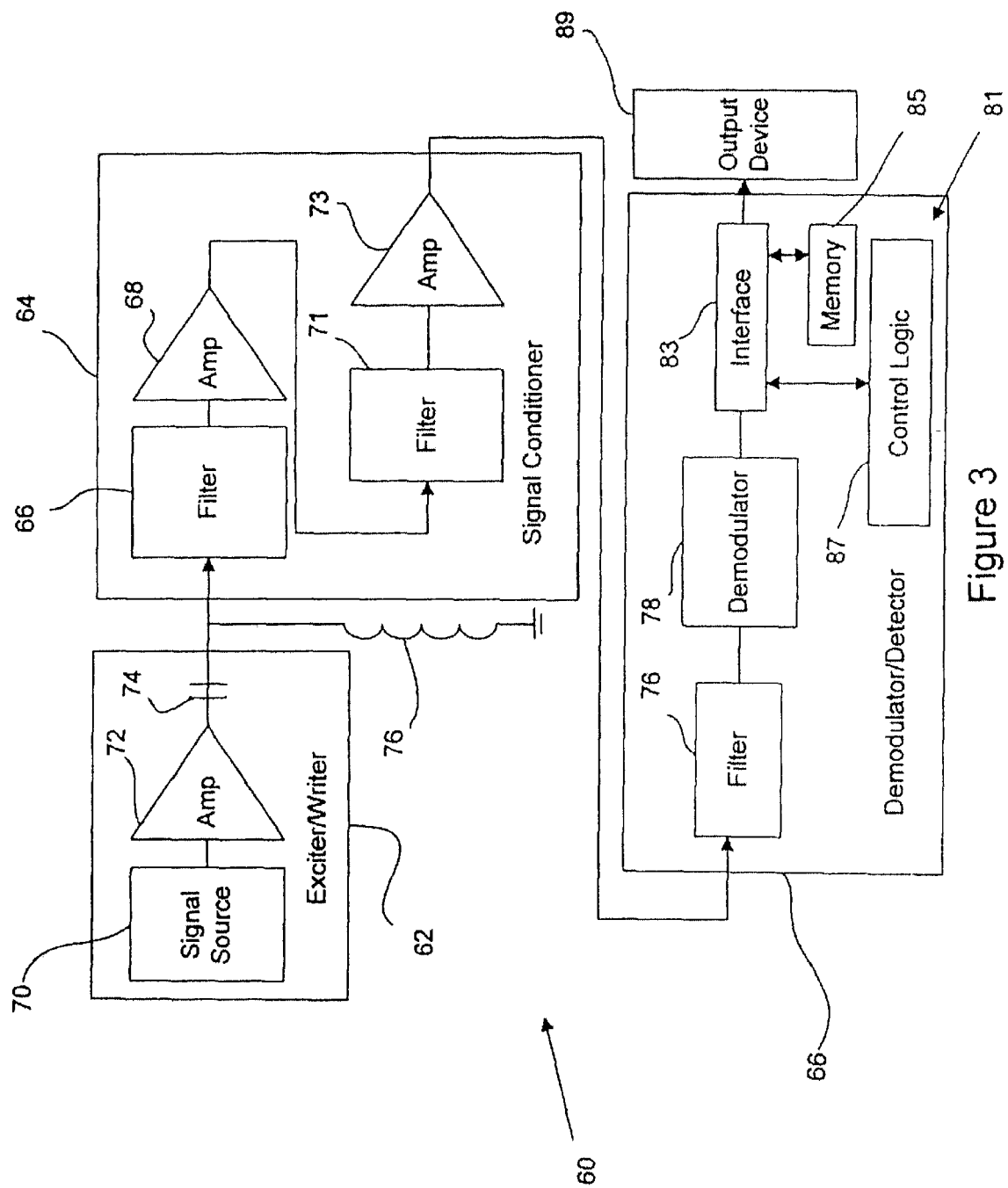
FIG. 3 is a block diagram illustrating an embodiment of an excitation reader/writer.

FIG. 3 illustrates an exemplary embodiment of an excitation reader/writer 60 which can be used, for example, as an excitation reader 12, an excitation writer 36, or an excitation reader 47. The excitation reader/writer 60 comprises three main functional units: an exciter/writer 62, a signal conditioner 64, and a demodulator/detector 66.

The exciter/writer 62 comprises an AC signal source 70 followed by a power amplifier 72 that amplifies the signal generated by the AC signal source 70 to provide a high current, high voltage reading or writing excitation signal to a capacitor 74 and an antenna coil 76. The inductance of the antenna coil 76 and the capacitance of the capacitor 74 are selected to resonate at the excitation signal frequency so that the voltage across the antenna coil 76 is greater than the voltage output of the power amplifier 72. The AC signal source 70 provides the reading or writing excitation signal that can include write data to be written into a non-volatile memory 110 of the transponder 91 (FIG. 4).

Figure 4:
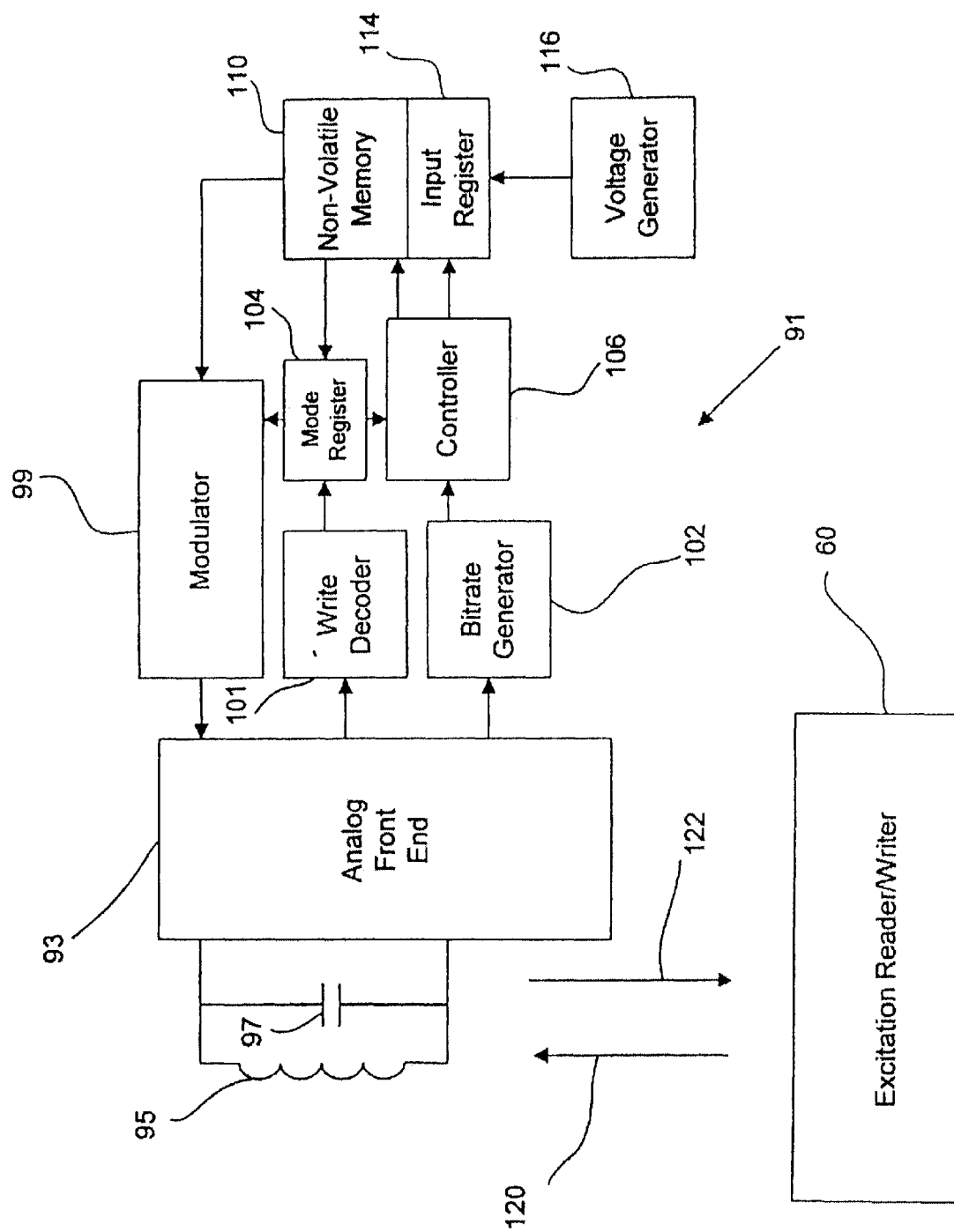
FIG. 4 is a block diagram illustrating a first embodiment of a transponder.

The signal conditioner 64, which is also coupled to the antenna coil 76, serves to amplify the RF response signal generated by the transponder 91 (FIG. 4). The signal conditioner 64 filters out the RF reading excitation signal frequencies as well as other noise and undesired signals outside of the frequency range of the transponder 91 response signals. The signal conditioner 64 includes a first filter 66 that passes the RF reading response signal frequency returned from the transponder 91. A first amplifier 68 increases the signal strength of the signal output by the first filter 66, and a second filter 71 passively excludes the high energy at the excitation frequency. A second amplifier 73 increases the signal strength of the second output by the second filter 71. The first and second filters 66 and 71 preferably include a band pass filter and a band stop filter. The first filter 66 and the second filter 71 can be switched, or a higher order filter providing both band pass and band stop filtering functions can be employed, as known in the art. Moreover, the first and second amplifiers 68 and 73 can be combined into a single amplifier.

The signal conditioner 64 is coupled to a filter 76 of the demodulator and detector 66, which further reduces the excitation signal energy. The filter 76 preferably comprises a low pass filter. The demodulator and detector 66 further includes a demodulator 78 and a microcomputer generally designated 81. The microcomputer 81 includes an input/output interface 83, a memory 85, and a microprocessor or control logic 87. The demodulator 78 can comprise an SK demodulator, for example, which includes a phase-locked loop circuit configured as a tone detector.

The demodulator 78 and the microcomputer 81 extract data from the response signal. To extract the data, digital signals are generated when the return signal from the transponder 91 shifts between two frequencies, in accordance with one embodiment of the present invention. Other well-known means for transferring information can also be used. The timing of the transitions of the digital signals between the logic levels or frequencies is detected. The information obtained by the microcomputer 81 can be stored in the memory 85 or transferred to an output device 89 such as a display, a printer, a network, another computer, or other devices or storage media. Other configurations of the excitation reader/writer 60 are possible, as would be apparent to those skilled in the art, so long as the general functions of energizing the transponder 91 with read and write signals are accomplished.

Turning now to FIG. 4, a first preferred embodiment of a transponder 91 is illustrated in combination with the excitation reader/writer 60. The transponder 91 can be used for the transponder 16 of FIG. 1 or the transponder 40 of FIGS. 2a–2b, for example. The transponder 91 includes an analog front end 93 having inputs connected to an antenna coil 95, a capacitor 97, and a modulator 99, and having outputs connected to a write decoder 101 and a bitrate generator 102. An output of the write decoder 101 is connected to a first input of a mode register 104. The mode register 104 has outputs coupled to the modulator 99 and a logic controller 106. A second input of the mode register 104 is coupled to a first output of the non-volatile memory 110. The first and second outputs of the controller 106 are coupled to a first input of the non-volatile memory 110 and an input register 114 of the non-volatile memory 110, respectively. A voltage generator 116 has an output coupled to the input register 114.

The analog front end 93 generates power from the current induced on the antenna coil 95 by the RF reading or writing excitation signal, which is a magnetic field produced by the excitation reader/writer 60. The analog front end 93 controls the data communications, one-way or bi-directional, with the excitation reader/writer circuit 60. The analog front end 93 rectifies the AC coil voltage to generate a DC supply voltage to power the transponder 91 and extracts a clock signal from the AC coil voltage. By way of example, the analog front end 93 selectively switches a load across the opposite nodes of the antenna coil 95 when transmitting the response signal from the transponder 91 to the excitation reader/writer 60. The analog front end 93 also detects a field gap that occurs when the excitation reader/writer circuit is attempting to write information into the non-volatile memory 110 during the writing mode. The controller 106 loads the mode register 104 with operational data from the memory 110 after power-on and during reading to minimize errors. The controller 106 controls reading and writing access to the non-volatile memory 110.

In the illustrated embodiment, the bitrate generator 102 allows for the selection of bitrates, which are fractional portions of the frequency of the RF excitation signal. Typically, the bitrate generator can be configured to allow selection of any of the following bitrates: RF/8, RF/16, RF/32, RF/40, RF/50, RF/64, RF/100, and RF/128, where RF equals the frequency of the RF excitation signal. The write decoder 101 determines whether a write data stream from the excitation reader/writer 60 is valid. The voltage generator 116 generates a supply voltage for programming the non-volatile memory 110 during, for example, a write signal. The mode register 104 can be configured to store the mode date from the non-volatile memory 110 and periodically refreshes the mode data during the reading mode, in accordance with one embodiment of the invention. The modulator 99 can be configured to allow for the selection of various different modulation schemes for the reading response signal including, for example, frequency shift key (FSK); phase shift key (PSK); Manchester; bi-phase; and combinations thereof. The non-volatile memory 110 preferably comprises an EEPROM. In operation, the excitation reader/writer 60 transmits an excitation signal 120, which can be a read excitation signal or a write excitation signal, to the transponder 91. The transponder 91 is energized by the excitation signal 120 and, in the event of a read excitation signal, for example, transmits a response signal 122 back to the excitation reader/writer 60.

Figure 5:
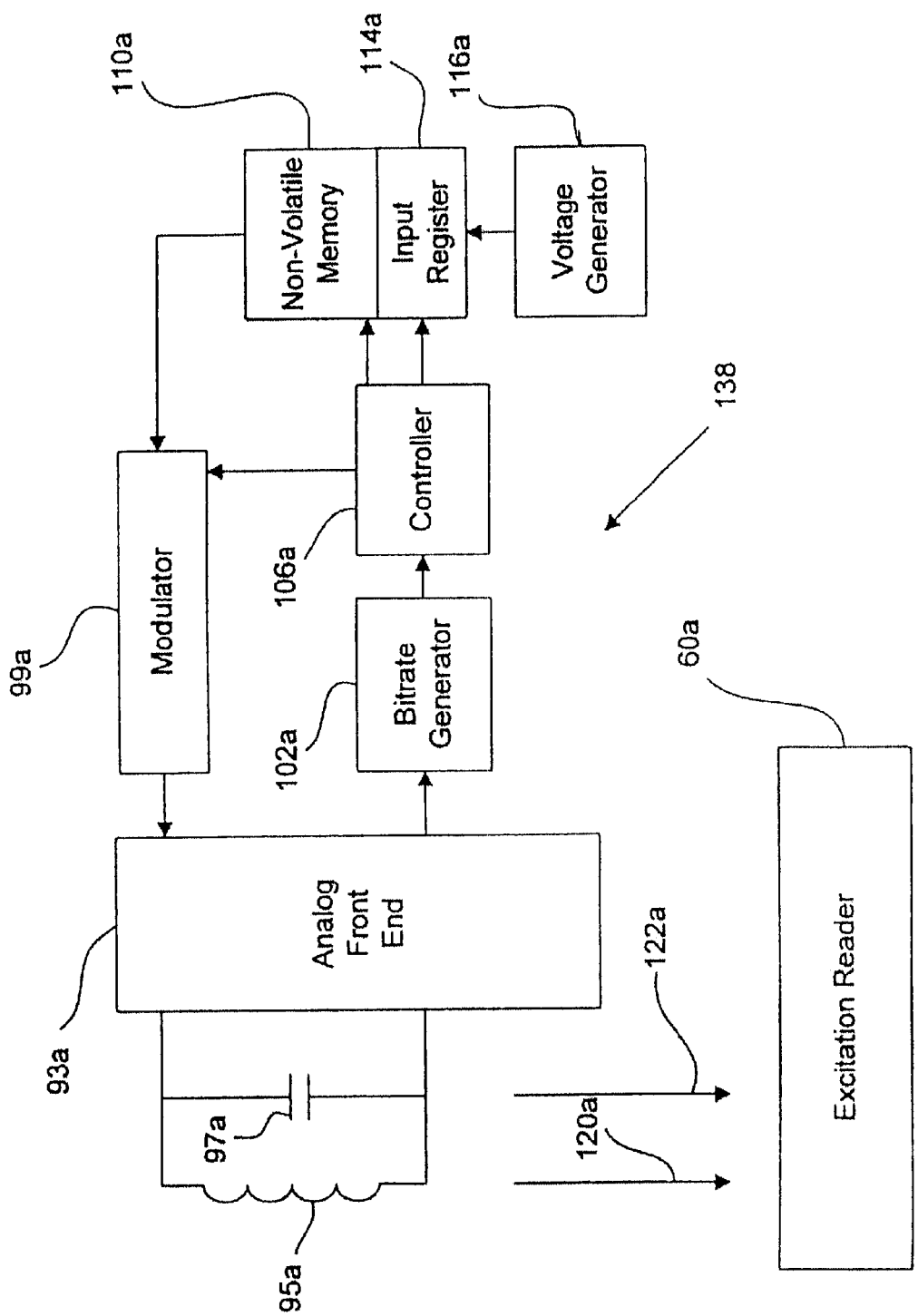
FIG. 5 is a block diagram illustrating another embodiment of a transponder.
Figure 6:
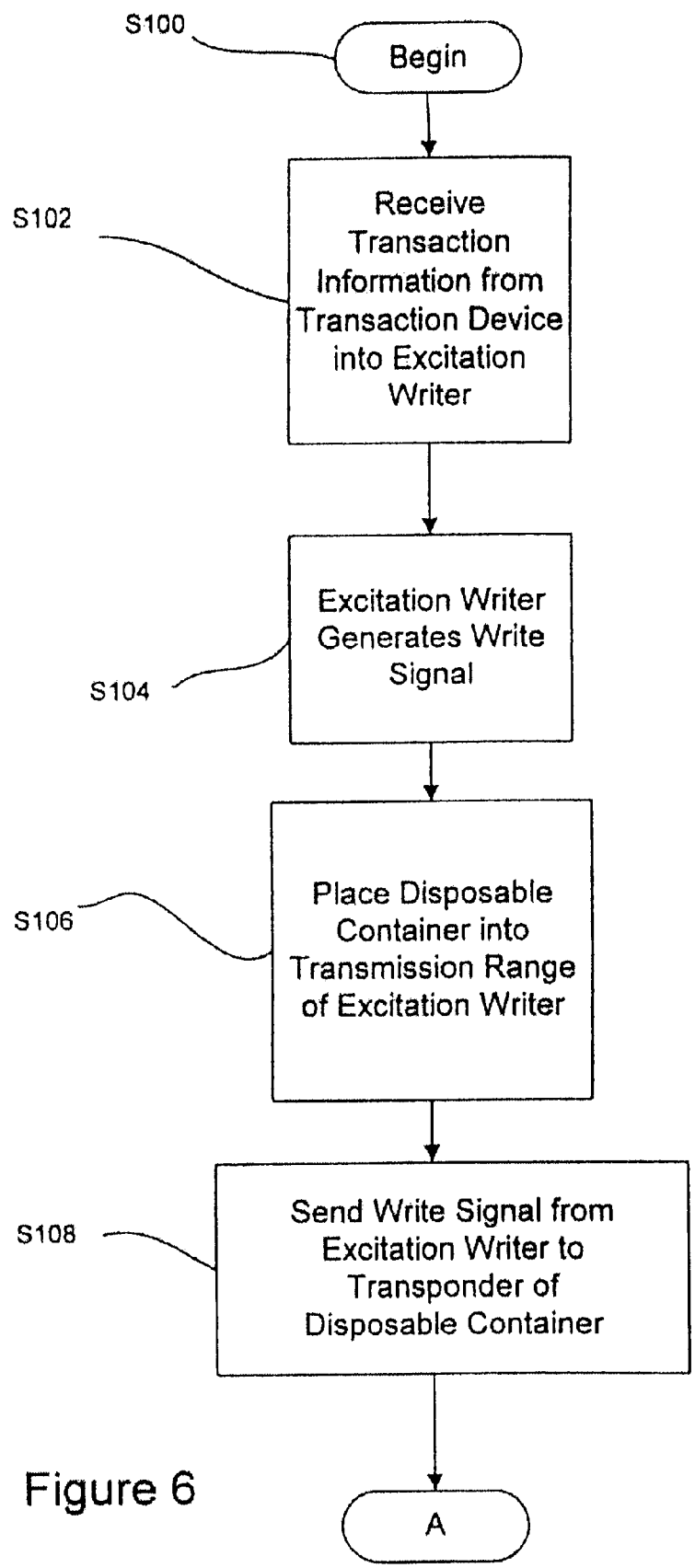
FIGS. 6–9 comprise a flow chart illustrating a first method of the invention.
Figure 7:
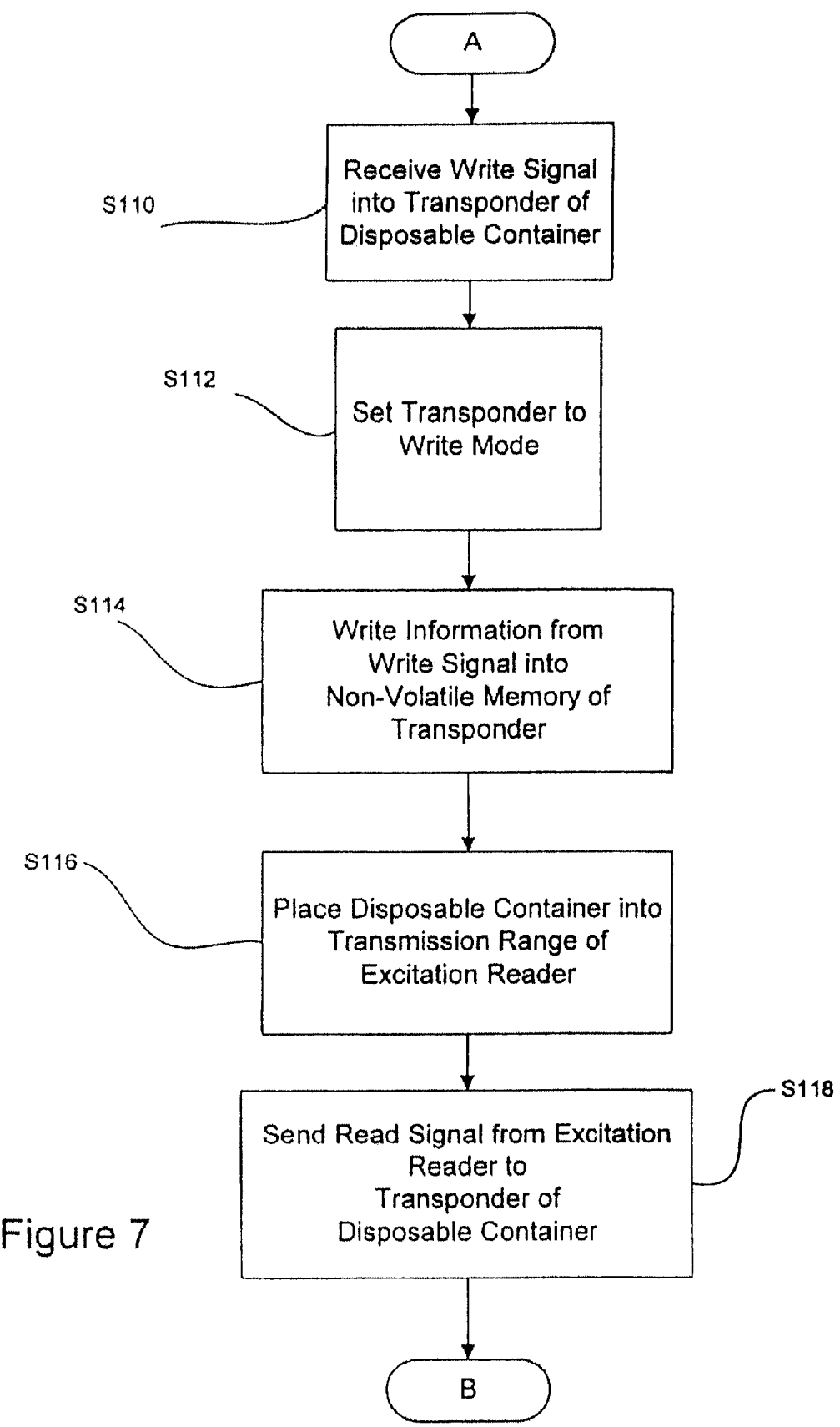
Figure 8:
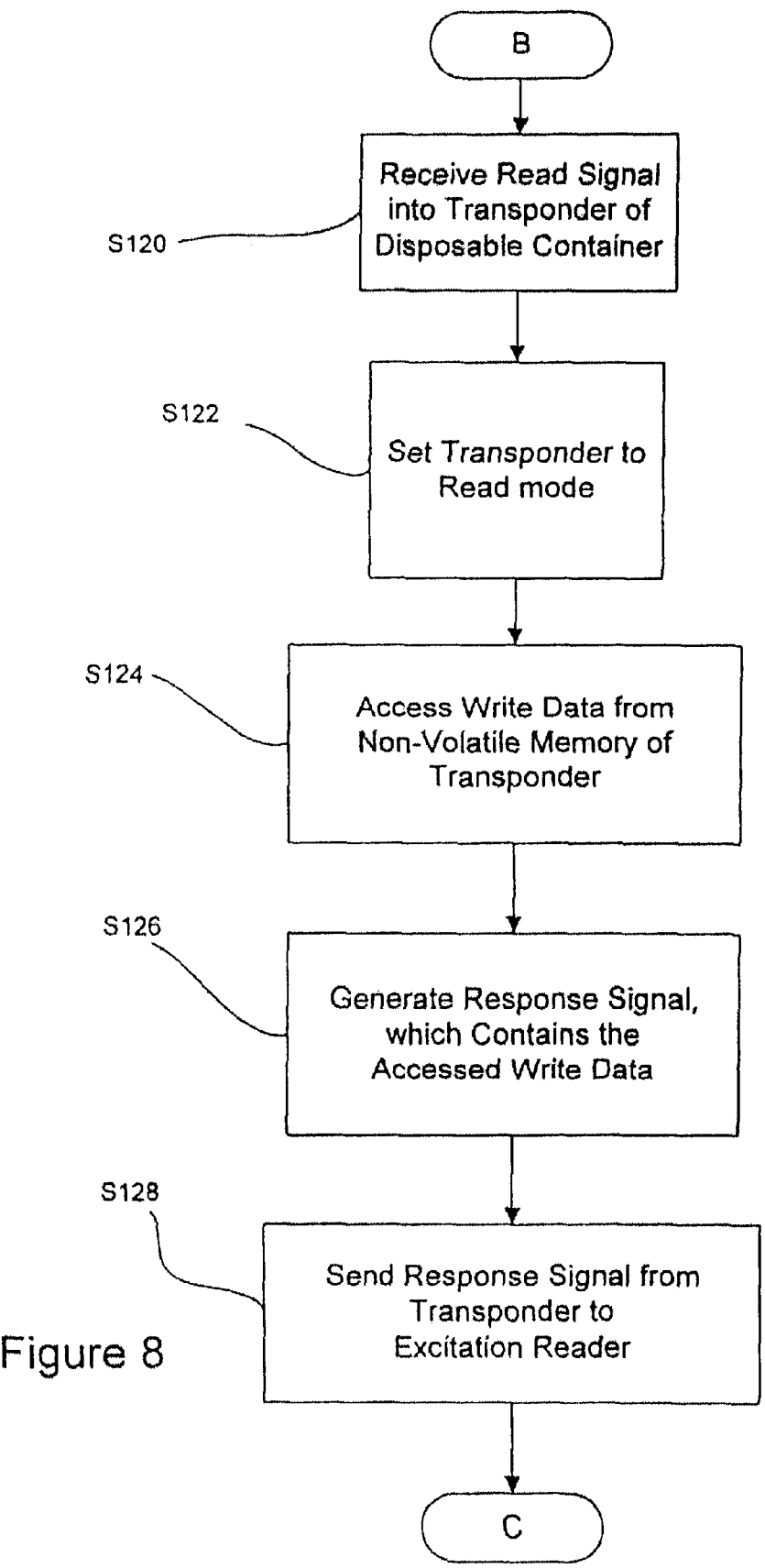
Figure 9:
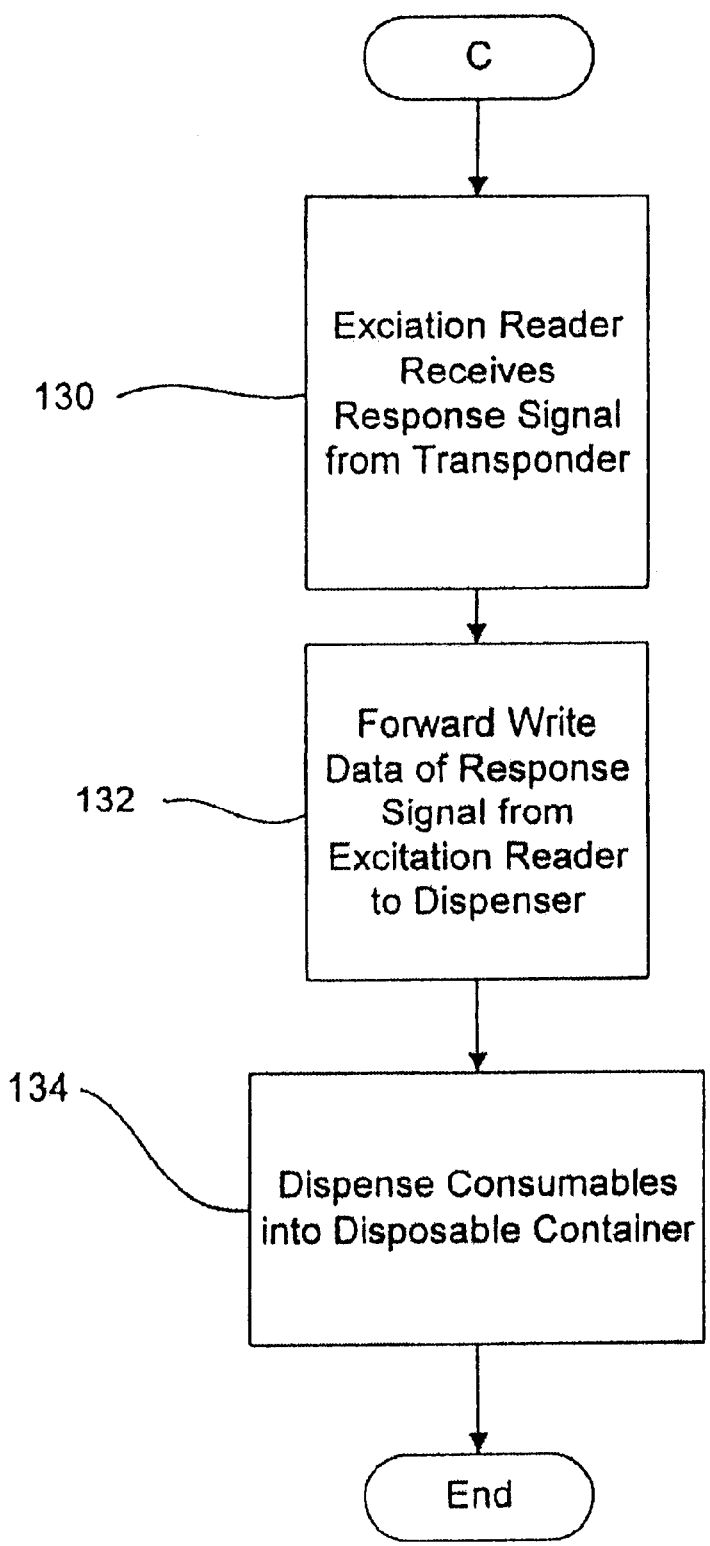

FIG. 5 illustrates an embodiment of a transponder 138, which is configured as a read-only transponder. In the embodiment of FIG. 5, like elements are designated with like reference numerals followed by the letter "a." The transponder 138 can be used as a transponder 16 of FIG. 1, for example.

FIGS. 6–9 comprise a flowchart illustrating a method of the present invention which generally corresponds to the structure shown in FIGS. 2a–2b. The method begins at step S100, and continues to step S102 where transaction information is received from the transaction device 34 into the excitation writer 36. At step S104 the excitation writer 36 generates a write signal, and at step S 106 the food container 38 is placed into transmission range of the excitation writer 36. As previously mentioned, a beverage container for holding the consumable materials, such as beverage, or combination of food and beverage, can be used instead of the food container 38. At step 108, a write signal is transmitted from the excitation writer 36 to the transponder 40 of the food container 38, and at step S110 the write signal is received into the transponder 40. The transponder 40 is placed into a write mode at step S112, and write information from the write signal 51 is placed into the non-volatile memory of the transponder 40. Steps S102 through steps S114 can occur, for example, at a cash register of a fast-food or other restaurant.

The programmed food container 38 is subsequently placed into a food preparation area, wherein the food container is positioned within transmission range of the excitation reader 47 (step S116). The excitation reader 47 sends a read signal to the transponder 40 of the food container 38 at step S118, and this read signal is received at step S120. The transponder 40 is subsequently placed into a read mode at step S122, and the write data is accessed from the non-volatile memory of the transponder 40 at step S124. A response signal, which contains the accessed write data, is generated at step S126 and sent to the excitation reader 47 at step S128. The excitation reader 47 receives the response signal at step S130, and forwards the write data of the response signal to the food dispenser 45 at step S132. At step S134, the food dispenser 45 dispenses consumables into the food container 38 in accordance with the write signal that was originally generated by the excitation writer 36. As previously mentioned, the food dispenser 45 can be configured to automatically generate an entire entree, such as a sandwich, in a fashion dictated by a customer's order. The food dispenser 45 can place a combination of different entrees, possibly even including a drink, into the food container 38, in accordance with one embodiment of the present invention.

Figure 10:
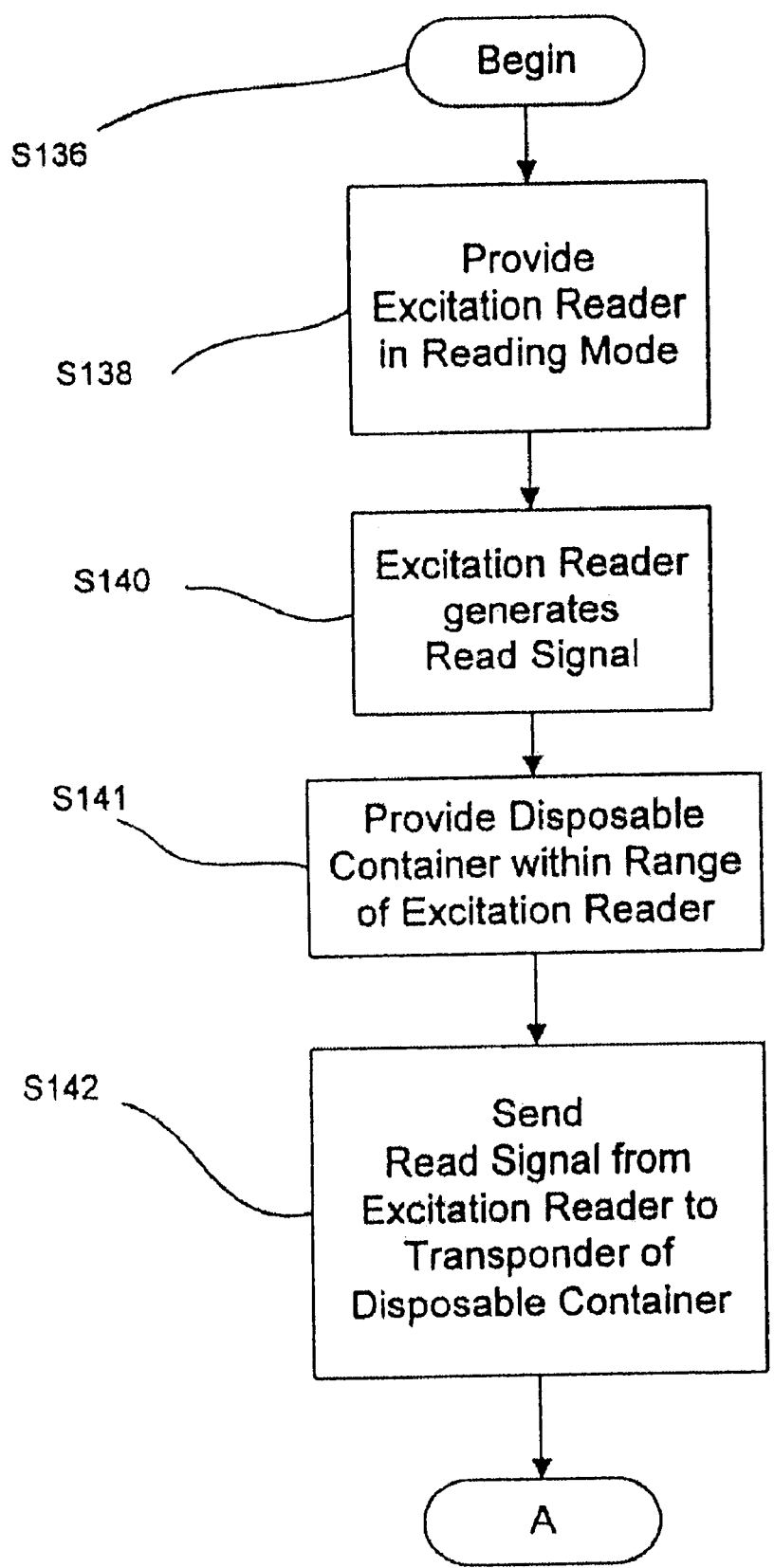
FIGS. 10–12 comprise a flow chart illustrating a second method of the invention.
Figure 11:
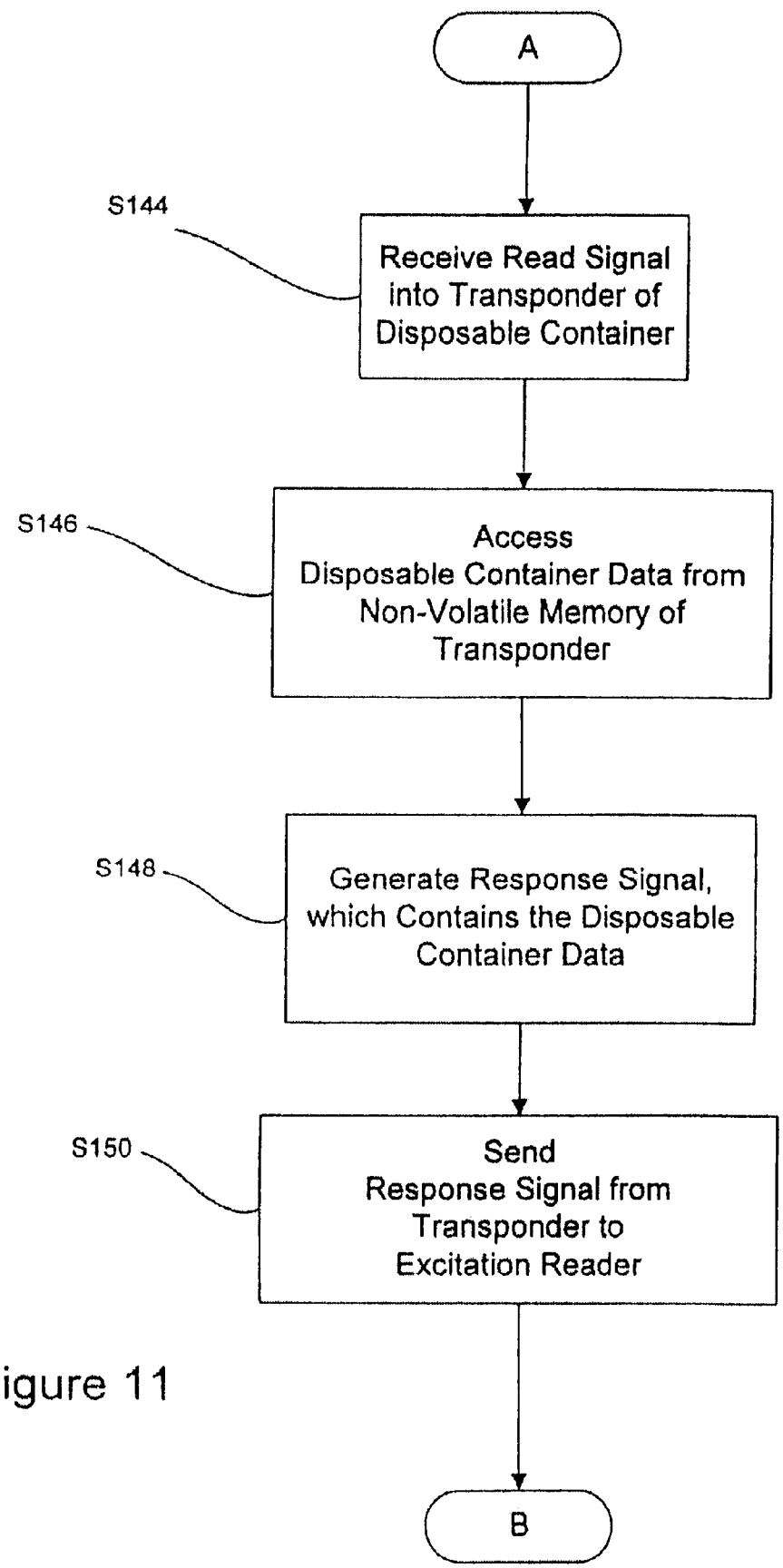
Figure 12:
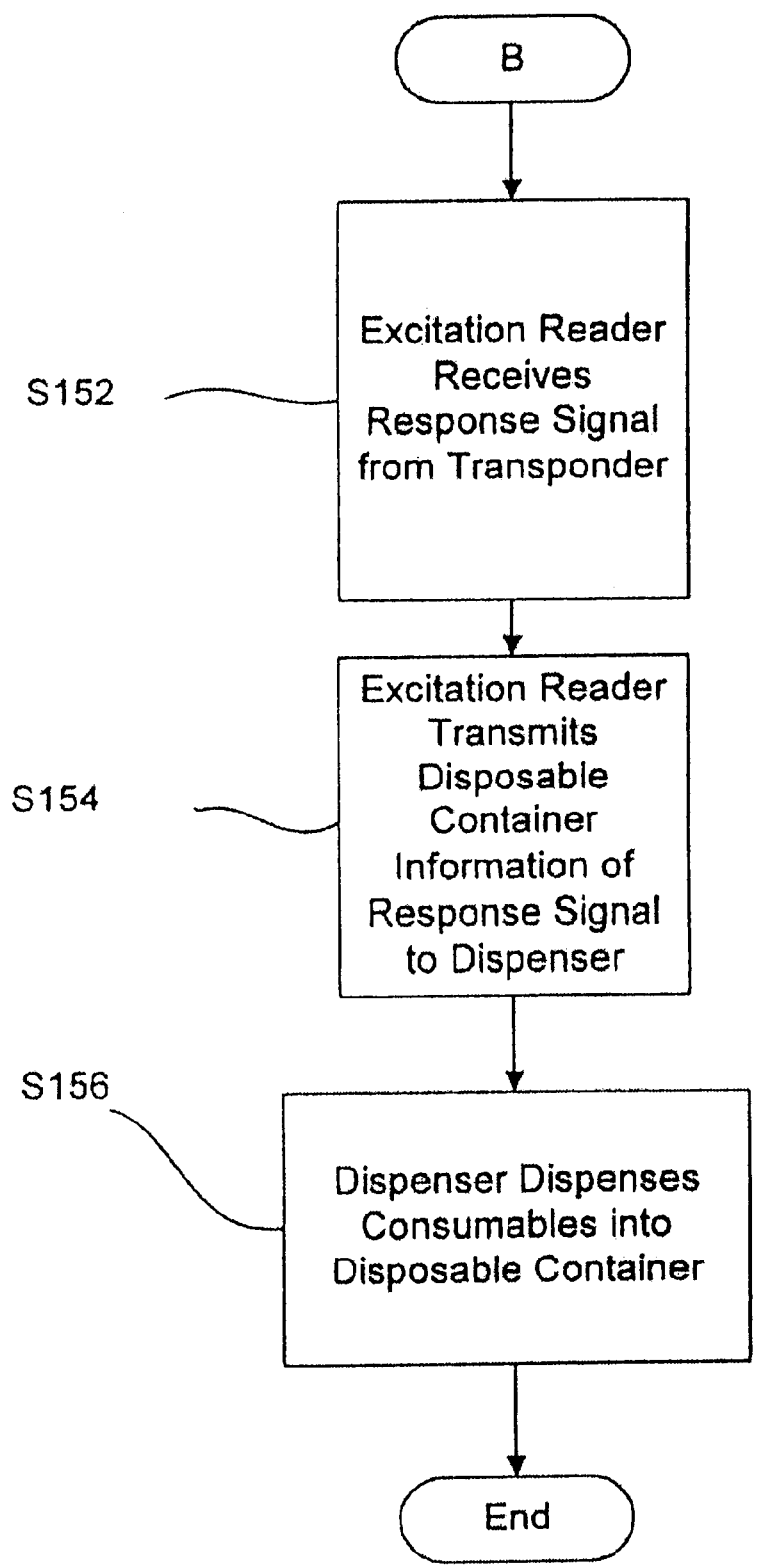

The flow chart set forth in FIGS. 10–12 corresponds to a method of the invention that can be implemented by the systems depicted in FIG. 1. The method begins at step S136 and continues to step S138 where the excitation reader 12 is provided in a reading mode. At step S140 the excitation reader 12 generates a read signal, and at step S141 the beverage (or food) container 14 is placed within range of the excitation reader 12. A read signal 25 is sent from the excitation reader 12 to the transponder 16 at step S142, and the read signal 25 is received into the transponder 16 at step S144. At step S146 the transponder 16 accesses container data from its non-volatile memory, and at step S148 the transponder 16 generates a response signal, which contains the container data. This response signal 27 is sent at step S150, and is received into the excitation reader 12 at step S152.

The excitation reader 12 forwards the container information, which can contain information regarding a size of the container, a type of consumable material, such as a food or beverage, to be placed within the container and information pertaining to whether the container is authorized to be filled with food or beverage, for example, to the beverage (or food) dispenser 10. In accordance with one embodiment of the present invention, the container information can include instructions for preparing a particular entree, such as a sandwich, or for preparing a combination of entrees and/or drinks within a container. At step S156 the dispenser dispenses consumables, which can include food and/or drinks, into the container in accordance with the container information forwarded by the excitation reader 12 to the dispenser 10.

As can be seen from the above, preferred embodiments of the invention provide methods and systems for filling and tracking food and/or beverage containers.

Various features and advantages of the invention are set forth in the following claims.

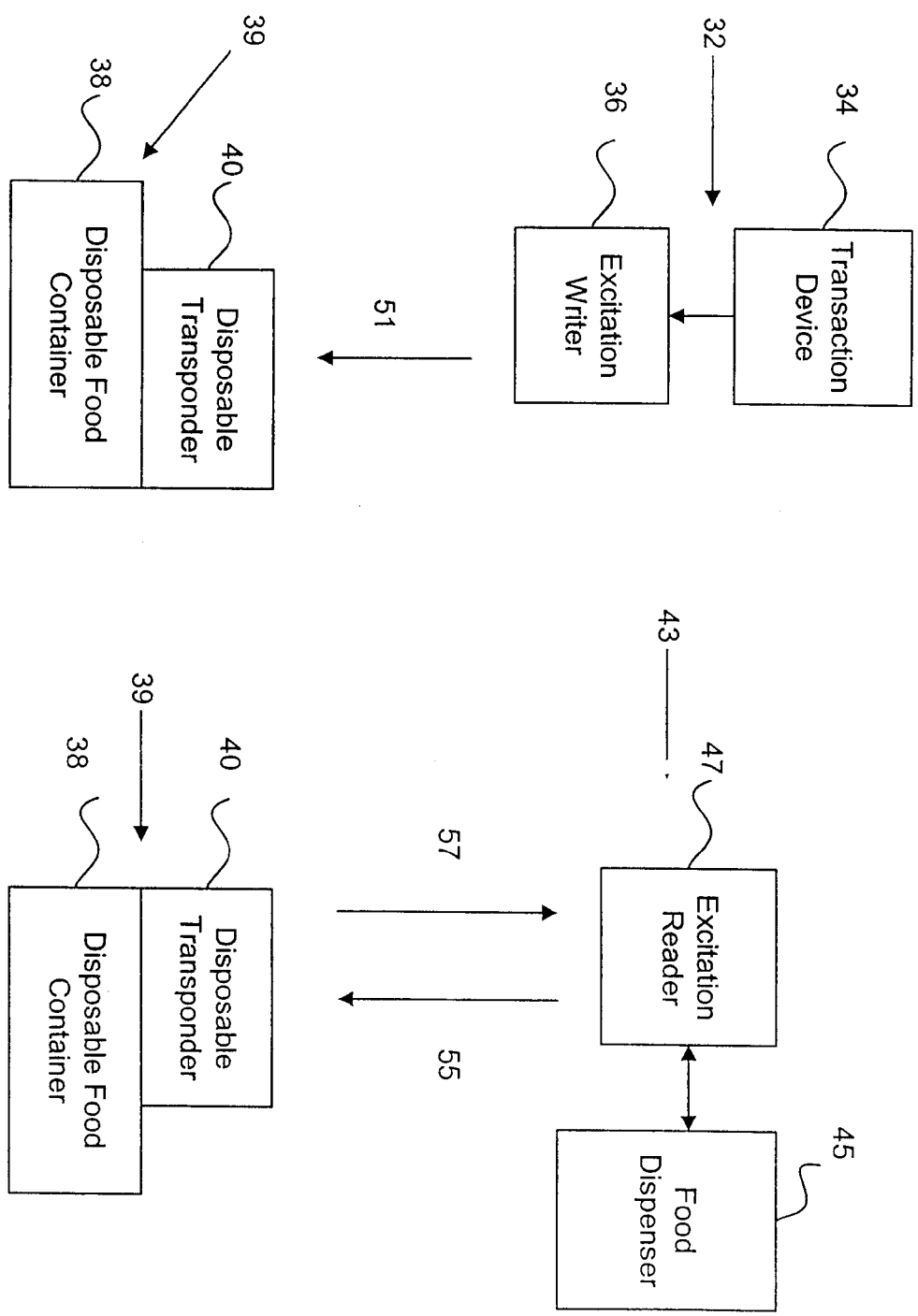

What is claimed is:

1. A food or beverage container, comprising:
   a body constructed to hold a consumable material; and
   a transponder connected to the body, the transponder being constructed to emit an RF transponder signal to a dispenser to automatically commence dispensing of the consumable material, the RF transponder signal having information about the consumable material including a predetermined quantity and quality of the consumable material ordered by a customer and to be dispensed by the dispenser, the transponder having a memory capable of being programmed with customer order data.

2. A container as claimed in claim 1, wherein the transponder has a memory containing identity data for the container.

3. A container as claimed in claim 2, wherein the identity data includes a serial number.

4. A container as claimed in claim 2, wherein the identity data includes information on the size of the container.

5. A container as claimed in claim 2, wherein the identity data includes information on the make of the container.

6. A container as claimed in claim 1, wherein the transponder has a memory containing one of at least identity or customer order data.

7. A container as claimed in claim 6, wherein the transponder, in response to an activation signal, generates an output signal based on the data in the memory.

8. A container as set forth in claim 1, wherein the body comprises a paper-based food receptacle.

9. A container as set forth in claim 1, wherein the body comprises a paper-based beverage receptacle.

10. A container as set forth in claim 1, wherein the body comprises a plastic cup.

11. A container as set forth in claim 1, wherein the body comprises a polystyrene cup.

12. A container as set forth in claim 1, wherein:
   the body has an outside surface and an inside surface, the inside surface being adapted to contact at least one of a food and a beverage; and
   the transponder is connected to the outside surface of the body.

13. A container as set forth in claim 1, wherein the transponder is disposed within the body.

14. A container as set forth in claim 1, wherein the RF transponder signal relates to a type of food to be held by the body.

15. A container as set forth in claim 1, wherein the RF transponder signal relates to a type of food to be automatically placed into the body.

16. A container as set forth in claim 1, wherein the RF transponder signal relates to a plurality of types of food to be automatically placed into the body.

17. A container as set forth in claim 1, wherein the RF transponder signal relates to a plurality of types of food to be sequentially placed into the body.

18. A container as set forth in claim 17, wherein at least one of the plurality of types of food to be sequentially placed into the body comprises a condiment.

19. A container as set forth in claim 1, wherein the RF transponder signal relates to a type of beverage to be placed into the body.

20. A container as set forth in claim 1, wherein the RF transponder signal relates to a quantity of beverage to be placed into the body.

21. A container as set forth in claim 1, wherein the consumable material comprises at least one of a food and a beverage.

22. A container as set forth in claim 1, wherein the RF transponder is a passive responder and constructed to receive an excitation signal, and in response emit the RF transponder signal.

23. A food or beverage container, comprising:

a body constructed to hold a consumable material; and a transponder connected to the body, the transponder constructed to emit an RF transponder signal to a dispenser to automatically commence dispensing of the consumable material, the RF transponder signal having information about the consumable material and wherein the transponder has a memory containing customer order data.

24. A container as claimed in claim 23, wherein the customer order data includes instructions for a food preparer.

* * * * *

UNITED STATES PATENT AND TRADEMARK OFFICE
CERTIFICATE OF CORRECTION

PATENT NO. : 6,572,016 B2
DATED : June 3, 2003
INVENTOR(S) : Michael Saveliev and James R. Schuster It is certified that error appears in the above-identified patent and that said Letters Patent is hereby corrected as shown below:

Drawings, Sheet 2 of 12, consisting of figures 2a and 2b should be deleted to appear as per attached sheet.

Signed and Sealed this

Seventeenth Day of February, 2004

JON W. DUDAS
*Acting Director of the United States Patent and Trademark Office*